United States Patent
Herrmann et al.

(10) Patent No.: US 8,243,294 B2
(45) Date of Patent: Aug. 14, 2012

(54) SIMPLIFIED WALK-UP PRINT DRIVER INSTALLATION

(75) Inventors: James F. Herrmann, Fairport, NY (US); Angelo Caruso, Marion, NY (US)

(73) Assignee: Eastman Kodak Company, Rochester, NY (US)

( * ) Notice: Subject to any disclaimer, the term of this patent is extended or adjusted under 35 U.S.C. 154(b) by 1147 days.

(21) Appl. No.: 12/100,558

(22) Filed: Apr. 10, 2008

(65) Prior Publication Data

US 2009/0257080 A1    Oct. 15, 2009

(51) Int. Cl.
*G06F 15/00* (2006.01)
*G06F 3/12* (2006.01)
*G06K 1/00* (2006.01)

(52) U.S. Cl. ..................................... 358/1.13; 358/1.15
(58) Field of Classification Search .................. None
See application file for complete search history.

(56) References Cited

U.S. PATENT DOCUMENTS

| | | | |
|---|---|---|---|
| 6,301,012 B1 | 10/2001 | White et al. |
| 6,823,526 B2 | 11/2004 | Howard et al. |
| 6,989,910 B2 | 1/2006 | Lomas et al. |
| 7,136,174 B2 | 11/2006 | Chapin et al. |
| 7,316,022 B2 | 1/2008 | Nishio |
| 2008/0055640 A1 | 3/2008 | Takahashi et al. |

FOREIGN PATENT DOCUMENTS

EP    1 022 652 A2    7/2000

*Primary Examiner* — Douglas Tran
(74) *Attorney, Agent, or Firm* — Donna P. Suchy

(57) ABSTRACT

An apparatus and method for loading and configuring a print driver onto a PC/workstation such that upon completion the PC/workstation is fully enabled to send print jobs to a printer connected on a network includes a unique methodology which eliminates virtually all of the steps, data entry, and decision points that a user would typically encounter. This printer-resident system includes the ability to have the target printer, upon a simple printer front panel pushbutton request, synthesize a complete installer program that is then written to a removable storage device, e.g., USB flash drive. Once written, the storage device is removed from the printer and installed on the user's PC/workstation. The user then accesses the flash drive contents and runs the installer program executable. The installer program, owing to the fact that it was created on the target printer, has all the information needed for a one-click, fully automated installation process.

24 Claims, 7 Drawing Sheets

SIMPLIFIED WALK-UP PRINT DRIVER INSTALLATION

CROSS REFERENCE TO RELATED APPLICATIONS

Reference is made to commonly assigned application U.S. Ser. No. 12/100,541, filed Apr. 10, 2008, entitled "SIMPLIFIED WALK-UP KIOSK DRIVER INSTALLATION", and which is assigned to the assignee of this application.

FIELD OF THE INVENTION

The invention relates to network printing and network document scanning and more particularly to a system and methodology for installing a printer driver or scanner driver onto a PC/workstation.

BACKGROUND OF THE INVENTION

Any and all users wishing to print to a networked printer device via the network must first install print driver software onto their PC/workstation. In a networked print environment, installing a print driver can be a troublesome and error prone task. The user must first understand how to locate and navigate through the PC/workstation Operating System Graphical User Interface (GUI) to launch the printer installation process. Once launched, the "add-a-printer" installer program will prompt the user to specify the location of the device print driver. If the print driver is located on a disk, e.g., CD or DVD, it may have become separated from the printer, held by another user, or lost.

If the print driver software is located on a remote network server, the user must be able to identify the network address (URL) for that specific web server. Many users will be unable to provide this information. Once the print driver is specified and loaded, the installer program will search the network for all available printers that match the type (manufacturer and model number) selected by the user. The installer program will then present that list of printer(s) to the user. This list may be rather lengthy and is likely to include information that quite often is not readily understood by the new user, who may or may not know which specific printer to select.

Further, whereas these initial installation steps highlighted above might be well spelled out within documentation provided by the printer original equipment manufacturer (OEM), this information is often unavailable for new users who have just gained access to network and who may be initiating this driver installation process many months or even years after the printer was first installed on the network. Yet another facet of the print driver installation challenge involves the proper identification and support for any and all optional accessories installed on the devices e.g., duplexer, additional paper trays, etc. Typically, the device driver installer configures only the standard/the user must manually configure baseline features, and any optional features within the device driver. Such a manual update process is often unknown to or not well understood by the user, resulting in the optional features being inaccessible to that user. Additionally optional printer accessories, e.g., a finisher, may have been installed some period of time after the printer was installed on the network. The traditional disk, CD, or server based print driver may not have been updated to reflect these optional accessories.

One prior art method (U.S. Pat. No. 6,989,910 B2) for automating the installation of shared printers over a network involves the deployment of an intelligent Print Server processing node. The Print Server, when carefully configured by a professional administrator, can be made to identify when a new printer has been installed on the network, then create an automated print driver installer program, which is then sent via email to a predefined group of users. Shortcomings of such a methodology include the infrastructure and manpower costs associated with the professional administration of a dedicated Print Server node. Further, the apparatus does not address the common need for new users to physically find the location of and then select a network printer that has been resident on the network for some period of time. Finally, any visitor on the network, given their lack of an email account, would not be able to tangibly benefit from this installation support.

Another prior art method (U.S. Pat. No. 6,301,012 B1) is focused on the automatic installation of a print driver onto a dedicated Print Server node but provides no means of support to assist the user with the installation of the print driver onto their individual PC/workstation.

Yet another prior art method (U.S. Pat. No. 7,136,174 B2) describes a networked printer with the capability of hosting its own web page (i.e., a printer resident web server) wherein installation software is available that when executed is able to manage the PC/workstation print driver installation process. However, this printer web page based installation program and process cannot be accessed without the new user first knowing the target network printer's IP address. The user must enter the IP address into a web browser as the URL to access the printer's internal web page. Many users will be unable to provide this key information or might enter the information incorrectly. This particular prior art invention recognizes this critical shortcoming of their web page based installation process and presents an alternative installation methodology when the IP address is unknown.

This alternative approach attempts to simplify the installation process by allowing the user to identify the particular network printer that they wish to access by physically going to the printer, and then via the printer front panel initiating the network broadcast of a unique printer "beacon". This beacon (a network data packet broadcast) is designed to enable the print driver installer to identify the specific printer that is targeted by the user. However, this alternative approach does not assist the user in any way with navigating through the PC/workstation Operating System GUI to launch the printer installation/configuration process. Furthermore, it does not assist the user with specifying the location of the device print driver installer. Given these shortcomings, many users will be unable to successfully install their print driver with this alternative methodology.

Accordingly, it is an objective of this invention to automatically assist and encourage a user to properly configure a printer driver to the appropriate settings and to provide a system and methodology that is considered to be simple, intuitive, accurate, and complete for all users (novice to expert). The method and related system can be also applied to other network linked devices such as network scanners.

SUMMARY OF THE INVENTION

The invention is in the field of computers and printer/copier systems and other network linked devices such as network document scanners. More specifically this invention provides a system and method for enabling any user, including those with no prior knowledge of the traditional print driver installation process, to successfully install printer driver software for a network-connected device such as a printer onto their PC/workstation using temporary memory to transport a complete synthesized installation program capable of supporting the printer. The system and method also includes automatic and precise configuration of the print driver to support the optional features that are available on the selected printer. Additionally, the system will automatically update the print driver to support printer optional features that might be installed after the initial print driver installation. The system and method can also be readily applied to installing document scanner driver software onto a PC/workstation.

DETAILED DESCRIPTION OF THE INVENTION

Figure 1:
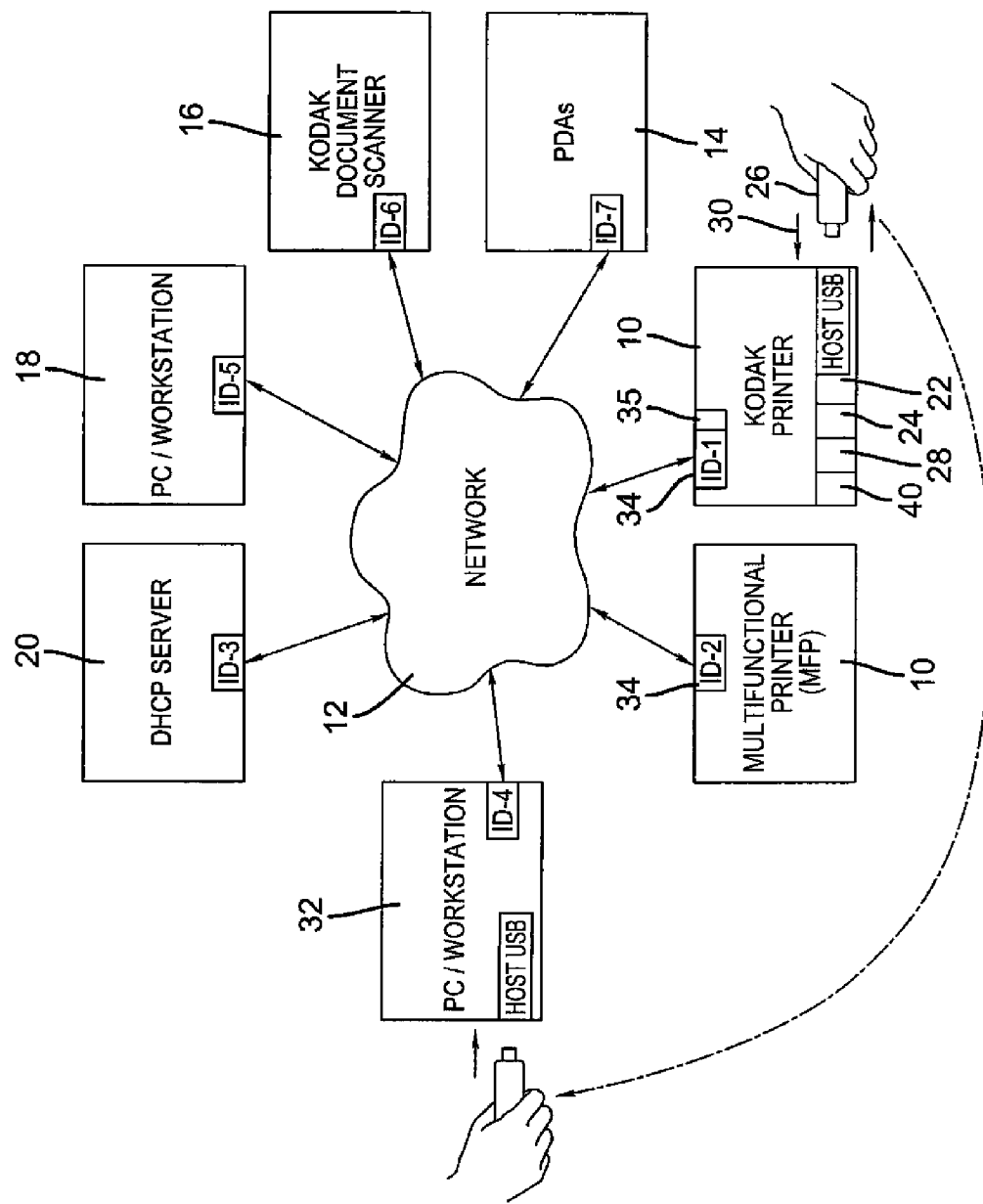
FIG. 1 is a schematic view of a network-printing environment including a simplified walk-up print driver system according to this invention.

FIG. 1 shows a fully automated installation process to allow a user to take advantage of a visit to one or more printers 10 that the user would like to use for printing from a user device 11. User devices 11 can include one or more devices that could be in communication with a network 12 such as a personal digital assistant (PDA) 14, a document scanner 16, workstation including a personal computer (PC) 18 and/or a server 20. After the user selects the printer the user wants to install onto the user device the system allows the user to install replicable printer installment instructions 22 for the selected, uniquely identified, printer 10. The instructions include a printer driver 24 for the user-selected printer 10. The user can use transportable temporary memory 26 responsive to a printer memory 28 through a connection (wired or wireless) 30 at the user-selected printer 18 to receive and transport the replicable printer installment instructions 22. The transportable temporary memory 26 types of memory include devices such as an USB thumbdrive, cell phone etc.

The user first determines what printer(s), which are spatially independent from the user device 11, the user wants to print to and accesses that printer by, for example, walking up to that printer. After installing the driver the user can access a menu to submit a print job when the printer is in communication with the computing network 12 using the user-selected printer's identification 34, e.g., the printer's IP network address, which is unique from other similar devices and is known to the printer's embedded controller 35. To initiate the installation process the replicable printer installment instructions are communicated through temporary communications, such as by using temporary memory 26, so that the user-selected printer's installed feature set and network IP address 36, along with the replicable printer installment instructions, are transferred from the specific printer 10 to the workstation or the user device 11 being used.

Figure 2:
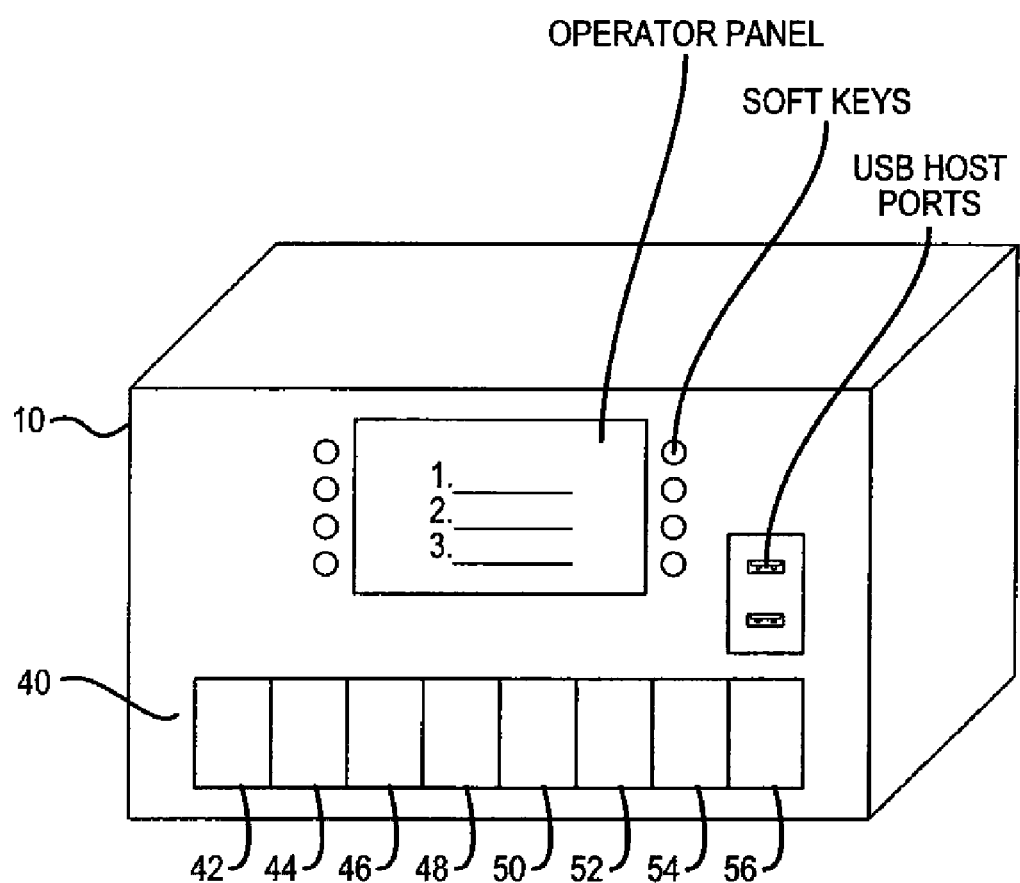
FIG. 2 is a schematic view of a network printer supporting the walk-up print driver synthesis system and highlights the locations of the key user interface items including the operator's control panel and USB Host ports.
Figure 3:
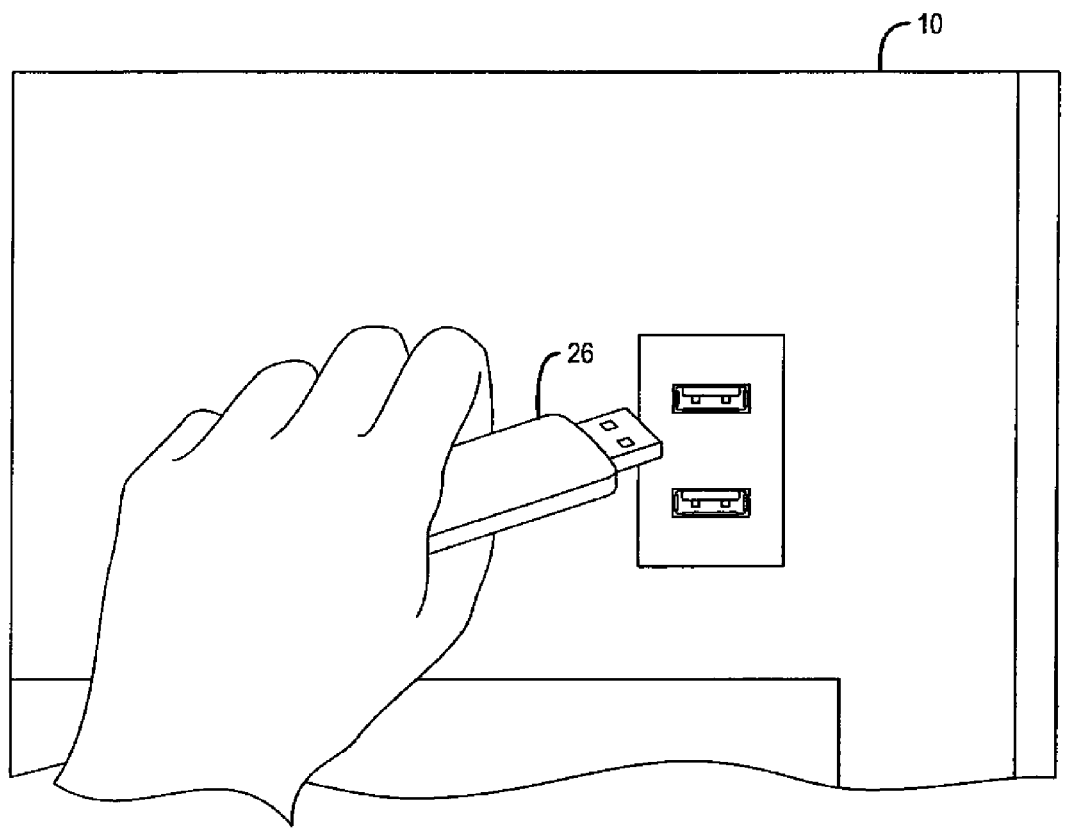
FIG. 3 illustrates one embodiment of the process of utilizing the simplified walk-up print driver system including inserting the USB flashes drive into one of the printer's host USB ports located on the front of the printer.
Figure 4:
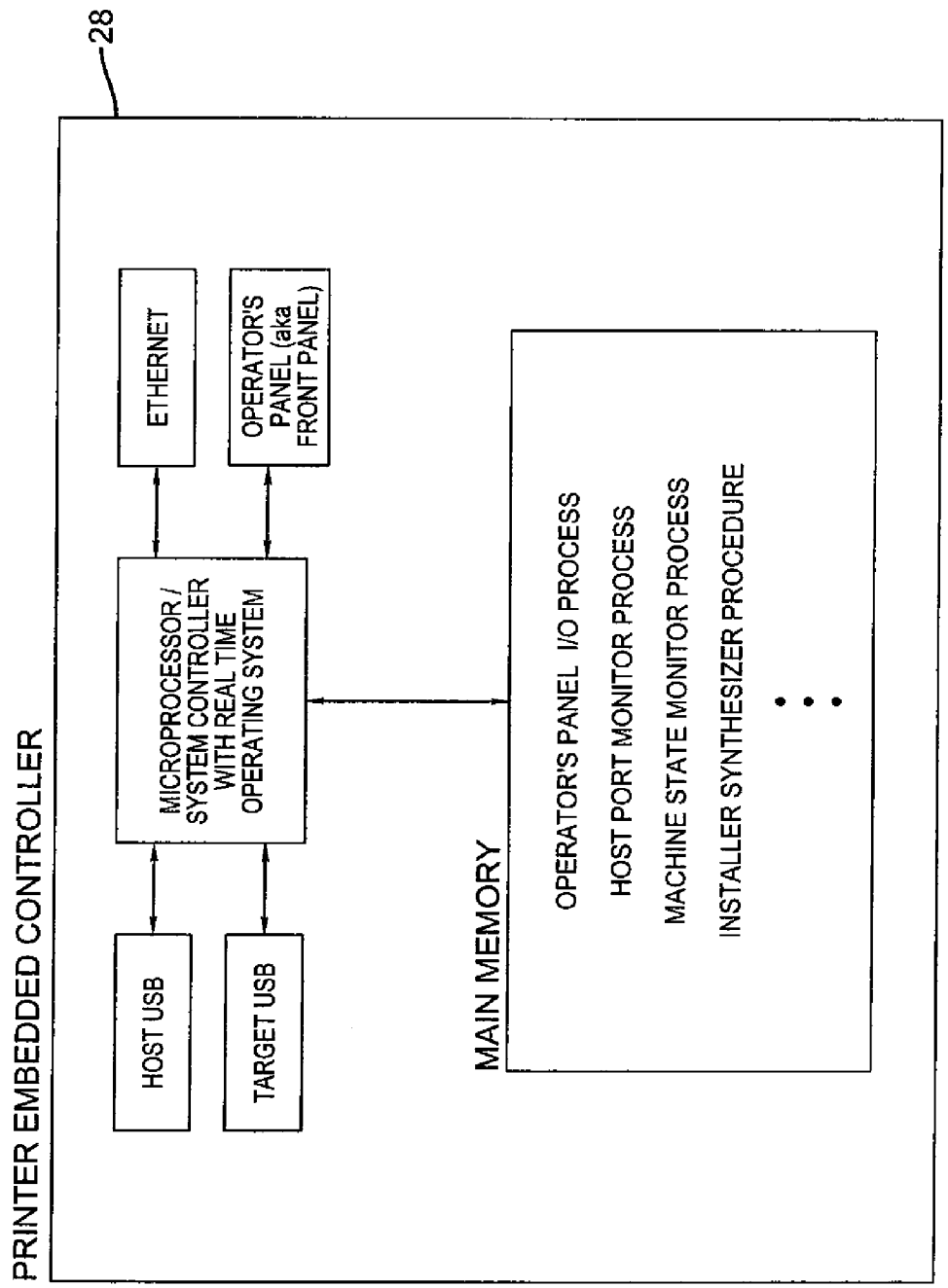
FIG. 4 illustrates a portion of the embodiment shown in FIG. 3 at a high level including the location of the EasyDriver Installer synthesis firmware within the overall printer electronics architecture.

Portions of the system are illustrated in FIGS. 2-4. The system and related method provides users of networked printers 10 with a simplified printer driver software installation process. Much of the invention functionality is supported in specialized firmware that resides within and is executed by the network printer's embedded controller 35. The embedded controller also allows for other actions, for instance during every power-up initialization, and also as an ongoing background task, the controller monitors the printer's hardware configuration and status. The configuration is stored and managed via an internal record structure, known as the configuration information record (CIR) 40. The following information is included within the CIR:

printer model number 42
printer serial number 44
printer embedded controller firmware revision 46
printer's network assigned IP address 48
printer's network assigned name 50
full URL path for the support website that facilitates downloading the most current and OS appropriate print driver 52
precise configuration information for the print driver that specifies any and all optional accessories installed on the device, e.g., duplex, paper trays, etc. 54
A unique sequential installer transaction ID parameter (INSTALL_ID) 56

Whereas some parameters contained within the CIR (e.g. model number & serial number) will be static and unchanging, others such as the optional features installed list are updated as needed. A paper path duplexer or high capacity paper tray, for example, may have been added well after the device was originally purchased and installed on the network. Whenever a change that has an impact on the print driver feature set is detected, the CIR is updated and stored to the embedded controller's non-volatile memory (NVM).

Figure 5:
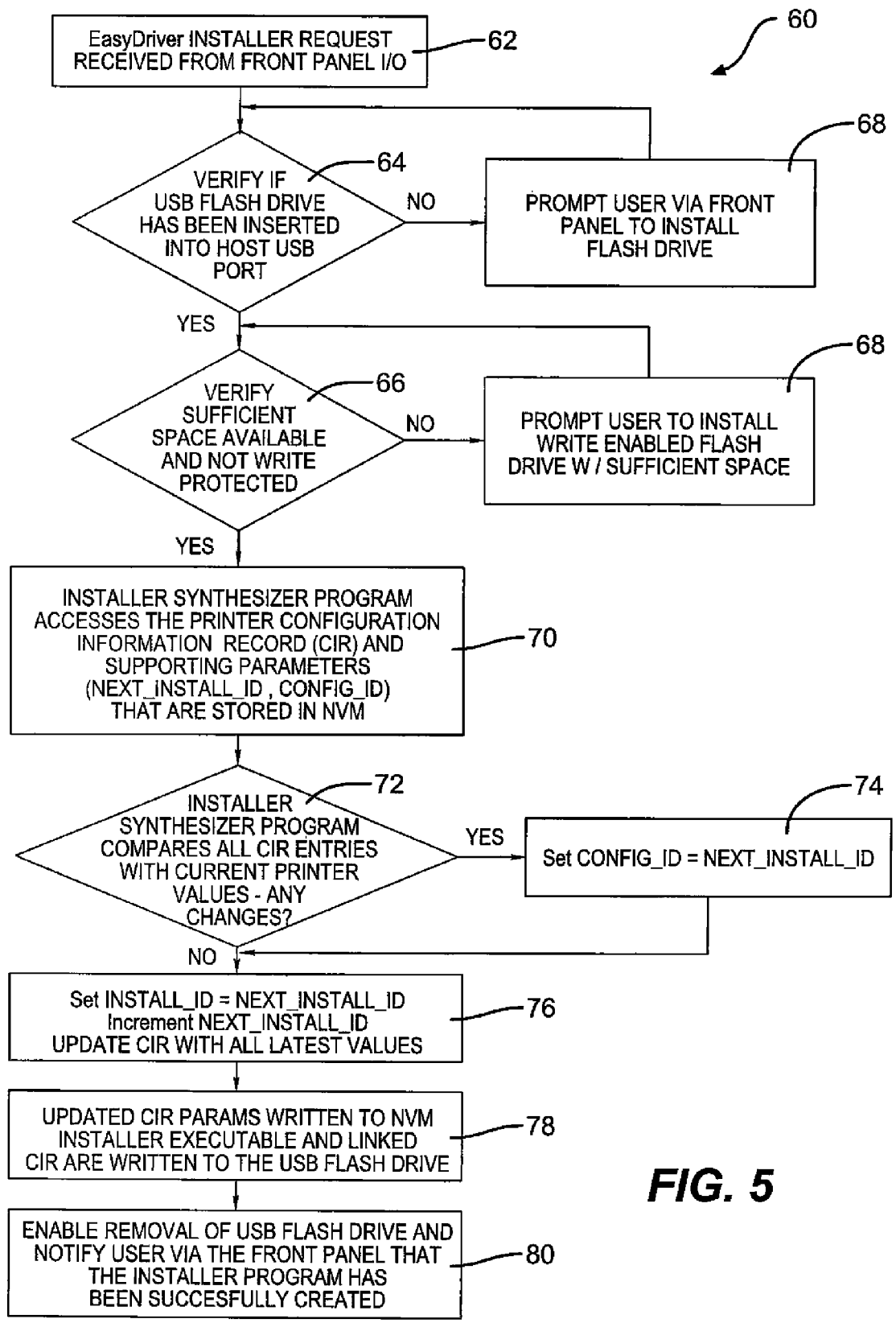
FIG. 5 shows a flow diagram depicting the steps required to write the installer program to the USB flash drive.

Method 60 to install the printer instructions is illustrated by the schematic shown in FIG. 5. The illustration method is designed to be simple for a user to initiate and should be comfortable for all types of users since it is location enhanced. The method uses a physical, hands-on approach to establishing a network printer connection as opposed to relying on a more ambiguous, logical association that is made remotely somewhere within the network cloud. In the past a key insight necessary to a successful simplified installation was overlooked and thus unexploited. Since users must physically go to the network printer location to pick up their completed print jobs there is an opportunity to use this need to locate the desired printer's location to also initiate a successful installation. Owing to their need to establish an exact physical location for their output before issuing a first print request, most users will physically walk to the printer to ensure they know where it is located. A fully automated installation process that is facilitated by a user's first reconnoitering visit to a printer location is both intuitive and inherently user friendly.

The method is initiated when the user walks up to the desired output device, shown here as printer 10, that is to be installed onto the user's input device 11. If the user wants to load the installation instructions the user simply makes an "Easydriver" installer request via the front panel IO 62 of the printer 10. The user is prompted via the front panel to install the temporary memory, represented here as a flash drive 68, in order to proceed with the method. Prior to initiating the method it is necessary to verify that there sufficient unprotected space available to proceed. The present invention employs the use of a temporary memory device and the temporary memory 26 used to carry out the installment process includes devices such as a USB removable flash Memory, a DVD disk, a wireless USB flash drive, and/or any wired or wireless device capable of being used as a temporary memory device.

The installer synthesizer program accesses any printer information relevant on that activation date and/or time and necessary to synthesize the driver instructions. Relevant information would include a configuration information record (CIR) and supporting parameters (NEXT_INSTALL_ID, CONFIG_ID) that are stored in the NVM 70. The Installer synthesizer program compares all CIR entries with current printer values. If any changes are detected, then the CONFIG_ID value is updated with the NEXT_INSTALL_ID value. Then, independent of whether there were any changes detected, the INSTALL_ID value is updated with the NEXT_INSTALL_ID value and the NEXT_INSTALL_ID value is incremented 74. The updated CIR parameters 76 are written to NVM and the installer executable and updated CIR are written 78 to the USB flash drive (temporary memory 26) which is ready to by transported to the user device 11. The temporary memory 26 is then removed 80 and the user notified via the front panel that the installer program has been successfully installed and that this is to be taken to the user device 11 that needs to install these instructions. The installer program, due to the fact that it was created on the target printer, has all the information needed for a one-click, fully automated and complete installation process.

Further, the system includes functionality within the embedded controller that enables the print driver to query and detect whenever the network printer's hardware configuration has changed for the uniquely identified printer from the last activation date and state. When a change is detected, the print driver will then access the complete configuration information record (CIR) that is maintained by the printer's embedded controller. The print driver will parse this CIR to determine what specific feature(s) and/or function(s) have changed and automatically update itself accordingly without user intervention. In this manner, the print driver functionality that resides on the user's PC/workstation is always perfectly synchronized with the printer's current hardware state.

This fully automated installation process, in one embodiment, is initiated when the user visits a desired printer location to implement the walk-up, fully automated installation process using the installer program, for the uniquely identified printer selected by a user that the user wants to access. The user is able to command the printer to synthesize a complete installer program by writing the replicable installer program to the temporary storage device 26. Then the user simply transports the installer program to the user device 11 and executes the installer program on the user device 11.

Figure 7:
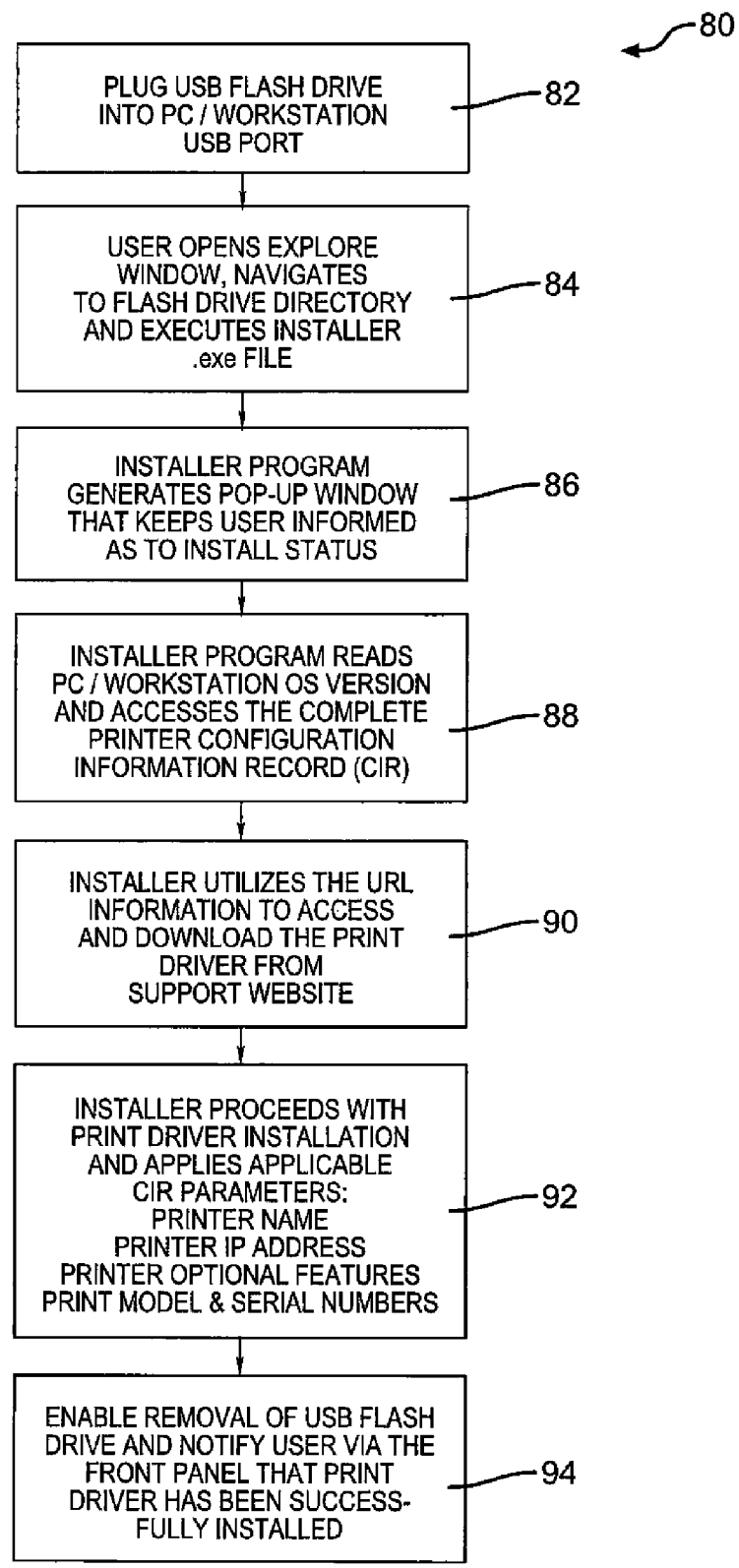
FIG. 7 shows a flow diagram depicting the operation of the Installer program executing the print driver installation process on the user's PC/workstation.

Once launched, the installer synthesis software executes per the flow diagrams in FIGS. 5 and 7. The synthesizer prompts the user to install a USB flash drive into one of the host USB ports available on the printer. Once a flash drive has been found, the available free space is determined. If there is insufficient space to support the installer executable or if the flash drive is write-protected, then the user is prompted to remedy those issues. After the user has installed an appropriate flash drive, the front panel display is updated to indicate that the installer synthesizer is in progress and warns the user not remove the USB flash drive until prompted. The synthesizer software reads the next available sequential transaction ID (NEXT_INSTALL_ID) and configuration ID (CONFIG_ID) parameters stored in the embedded controller's NVM. It also reads the complete CIR from NVM. The synthesizer compares the CIR with the current printer state. If the configuration is changed, then the CONFIG_ID is set equal to the NEXT_INSTALL_ID. Further, the CIR is updated to reflect the current printer state, and the CIR[INSTALL_ID] is set equal to NEXT_INSTALL_ID. The controller then increments the NEXT_INSTALL_ID parameter value and writes all updated parameters back to NVM.

The synthesizer then writes the installer executable along with the linked CIR to the USB flash drive. Once the writing process is completed, a front panel message informs the user that the flash drive installer is complete and can be removed. The completed installer program executable that has been written to the flash drive has all the information needed to facilitate a one-click fully automated installation process as described above in more detail.

The user transports (walks) the USB flash drive to their PC/workstation and plugs the drive into their PC's USB host port. The user then simply brings up an explore window and navigates to the USB flash drive directory. The user then runs the installer executable file located in the root directory.

The next portion of the simplified walk-up print driver installation system for installing replicable printer installment instructions for a printer selected by a user as the printer the user wants to install is illustrated on FIG. 7 using the printer driver for the user-selected printer. The user-selected printer 10 interacts with the transportable temporary memory responsive to a printer memory through a connection(wired or wireless) at the user-selected printer. The transportable temporary memory could be an USB thumbdrive, a cell phone, a camera or any other device with memory that you can transport. The replicable printer installment instruction memory including replicable printer installment instructions is on the temporary memory 26, as described above, that is temporally independent from the printer but in communication (wired or wireless) with the temporary memory by inserting the temporary memory into the printer.

Figure 6:
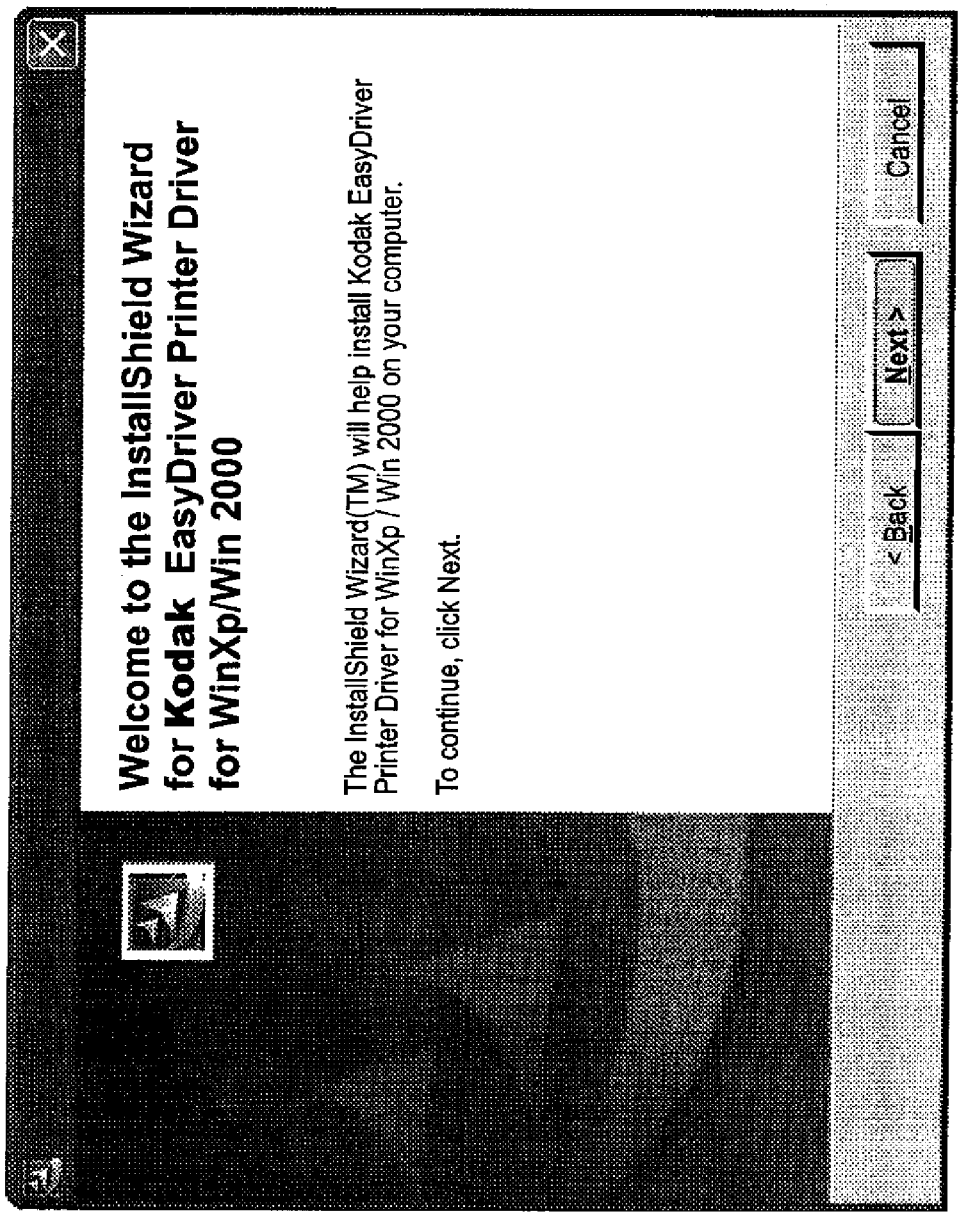
FIG. 6 shows a screen shot of a dialog box needed to launch the installer program after the USB flash drive has been inserted into the user's PC/workstation USB port.

FIG. 6 shows a screen shot of a dialog box needed to launch the installer program after the USB flash drive has been inserted into the user's PC/workstation USB port.

FIG. 7 shows that in this embodiment the user then walks back to the computer to install the replicable printer installment instructions 80 communicated through the temporary device using optional an user-selected printer identification. Note that communicating the installer program to a user device may use the web or the printer itself to communicate at least some of the installer program directly via the web to minimize the temporary memory necessary since some installation programs may be too large to be stored, in totality, on the temporary memory device. The user plugs the USB flash drive into the PC/Workstation USB port 82 and opens explore window to navigate to a flash drive directory and executes the installer.exe file 84. The installer program in this embodiment generates a pop-up window that keeps the user informed during the install process 86. The installer program reads the PC/Workstation OS version and accesses the complete printer CIR 88 and then utilizes the URL information to access and download the print driver from the support website 90 through the network. The installer proceeds with the print driver installation 92 and applies the applicable CIR parameters such as Printer Name 50, printer ID address 48, the printer optional features and print model and serial number as discussed above in relation to CIR description. Finally the USB flash drive is removed and the user notified via a pop-up, or other appropriate communication method, that the installation of the print driver has been successfully completed 94.

Another aspect of the invention involves a methodology for supporting automatic updates to the print driver configuration and settings for accessing the printer's feature set. Whenever the print driver is invoked on the user's PC/workstation, the driver will automatically query the printer's embedded controller for the CONFIG_ID parameter and compare that to its own assigned INSTALL_ID to determine if there have been any updates or enhancements made to the printer. If the networked printer feature set has been enhanced or updated in any way (as confirmed by the print driver's INSTALL_ID value being less than the printer's CONFIG_ID value) then the print driver will retrieve the complete CIR, parse CIR contents to detect the change(s), and auto-update itself accordingly without user intervention.

In lieu of accessing an external website for downloading the print driver, the network printer itself can support the web server function and serve up all versions of the print driver. Owing to the fact that the CIR includes the printer's IP address, then the Installer is fully enabled to automatically access a printer resident web server. In addition the present invention can generate printer updates and alerts for new hardware, such as finishers, software/firmware updates, and media status (type loaded, amounts remaining, etc.). Using various record keeping means between the user and the printer (e.g. you were user number 28+a time/date stamp to download the access information, when access is established via the user's PC, the user is designated user 28) can enable these alerts. This could be also be used for hardware/software accessory/version control, (e.g. only users established after a certain date receive notices), and could also be used to predict consumable consumption (e.g. 78 users have requested access in the last 30 days, increase next toner purchase by "x").

Another embodiment uses all the various versions of the print driver executable can be written to the USB flash drive (along with the installer executable and the linked CIR). In this manner, the flash drive becomes a single and complete resource for completing the print driver installation. This embodiment eliminates the need for the PC/workstation to have an active network interface available during the installation process.

The above installation could be applied to scanners in a similar manner involving walking up to a networked document scanner devices (e.g., Kodak Document Imaging's scanners). The scanner would synthesize an installation program as discussed above in conjunction to a printer driver. The installation program would need to be taken to the user device 11 and installed in a manner similar to that described above in order to install the network scanner device driver on the user device in a manner similar to that described above in conjunction to printers.

The invention has been described in detail with particular reference to certain preferred embodiments thereof, but it will be understood that variations and modifications can be effected within the spirit and scope of the invention.

What is claimed is:

1. A method for walk-up, fully automated installation process, the method comprising the steps of:
   accessing replicable printer instructions, including an installer program, for an uniquely identified printer selected by a user as the printer the user wants to access;
   commanding said printer to synthesize a complete installer program including an unique printer identification and activation date;
   writing the replicable installer program for the unique printer identification and activation date to temporary storage device;
   communicating the installer program to a user device; and
   executing the installer program on said user device by installing and accessing the temporary storage device contents for the unique printer identification and activation date.

2. A computer program stored in a computer-readable medium for causing a computer to execute the method according to claim 1.

3. The method of claim 1 for communicating the installer program to a user device further comprising communicating at least some of the installer program via the web.

4. The method of claim 1, said accessing step further comprising using a front panel pushbutton request, the user is able to command the printer to synthesize a complete installer program that is then written to a removable storage device for the unique printer identification and activation date.

5. The method of claim 1, said temporary device comprising USB thumbdrive, cell phone or other portable device.

6. The method of claim 1, further comprising:
   querying and detecting whenever the network printer's hardware configuration has changed for the unique printer since the last activation date;
   accessing a complete configuration information record (CIR) at the new date maintained by the printer's embedded controller with the print driver;
   reviewing said CIR to determine what specific feature(s) and/or function(s) have changed; and
   automatically updating instructions accordingly so that the print driver functionality residing on the user device is synchronized with the printer's current hardware state at any date and state.

7. The method of claim 6, further comprising creating the incremental installation program on the uniquely identified printer using the web server so that the program has all the information needed for an updated device driver.

8. The method of claim 1, further comprising monitoring one or more dedicated customer support web servers for postings of new releases of print driver software, comprising:
   detecting new releases of print driver software for the uniquely identified printer on the web server;
   updating CIR to reflect this new information post last check date;
   querying with the print driver the embedded controller to determine if updated driver code is available;
   prompting the user for permission to execute the automatic driver installation process; and
   installing the update.

9. The method of claim 8, further comprising creating the incremental installation program on the uniquely identified printer using the web server so that the program has all the information needed for an updated device driver.

10. A system for installing replicable printer installment instructions for an uniquely identified printer selected by a user, comprising:
   a. transportable temporary memory device responsive to uniquely identified printer comprising a printer driver at an access time through a connection at the printer that is alternately in communication with a computing network for activating the printer using said identification for printing;
   b. replicable printer installment instructions loaded on said memory device comprising replicable printer installment instructions transferred from said printer using a printer communication port and loaded on said temporary memory with an unique printer identification and an access time;

c. user device capable of communication with said temporary memory, and alternately communication with said network, for receipt and installation of said replicable printer installment instructions comprising said unique printer identification and time; and d. confirmation instructions to ensure said replicable printer installment instructions were correctly installed on the user device prior to activating printing using said user-selected printer.

11. The system of claim 10, said communication further comprising wireless communication.

12. The system of claim 10, said printer further comprising a front panel pushbutton request to allow the user to command the printer to synthesize a complete installer program that is then written to said removable temporary memory for the unique printer identification and activation date.

13. The system of claim 10, said temporary device comprising USB thumbdrive, cell phone or other portable device.

14. The system of claim 10, further comprising further communication instructions for querying and detecting whenever the network printer's hardware configuration has changed for the unique printer since the last activation date;
   accessing a complete configuration information record (CIR) at the new date maintained by the printer's embedded controller with the print driver;
   reviewing said CIR to determine what specific feature(s) and/or function(s) have changed; and
   automatically updating instructions accordingly so that the print driver functionality residing on the user device is synchronized with the printer's current hardware state at any date and state.

15. The system of claim 10, further comprising monitoring instructions for further communicating with one or more dedicated customer support web servers for postings of new releases of print driver software, comprising:
   detecting new releases of print driver software for the uniquely identified printer on the web server;
   updating CIR to reflect this new information post last check date;
   querying with the print driver the embedded controller to determine if updated driver code is available;
   prompting the user for permission to execute the automatic driver installation process; and
   installing the update.

16. The system of claim 15, further comprising confirmation reports for the uniquely identified printer using the web server so that the user has all the information needed for the print status of said user device at said time.

17. The system of claim 10, further comprising temporary memory comprising one of an USB thumbdrive, cell phone or entertainment device.

18. The system of claim 10, said unique identification further comprising an access account so that the user could be pre-authorized for a printing account on the user device.

19. The system of claim 10, said communication further comprising printer generated updates and alerts for new hardware, such as finishers, software/firmware updates, and media status.

20. A method for enabling a printer having a print driver to query and detect whenever the network printer's hardware configuration has changed if change is detected, the method comprising the steps of:
   accessing said printer's complete configuration information record (CIR) maintained by the printer's embedded controller;
   using said print driver to parse this CIR to determine what specific feature(s) and/or function(s) have changed and automatically updating the print driver functionality residing on a user device so that it is synchronized with the unique printer at that time including a current hardware state.

21. The method of claim 20, further comprising enables an embedded controller to monitor a dedicated customer support web server for postings of new releases of its print driver software, comprising
   detecting a new release of print driver software on a web server; and
   updating said CIR to reflect this new information if it is determined updated driver code is available by prompt the user for permission to execute the automatic driver installation process.

22. A non-transitory computer readable media that can be executed by a processor for fully automated installation process, comprising:
   a code segment for accessing replicable printer instructions, including an installer program, for an uniquely identified printer selected by a user as the printer the user wants to access;
   a code segment for commanding said printer to synthesize a complete installer program including an unique printer identification and activation date;
   a code segment for writing the replicable installer program for the unique printer identification and activation date to temporary storage device;
   a code segment for communicating the installer program to a user device; and
   a code segment for executing the installer program on said user device by installing and accessing the temporary storage device contents for the unique printer identification and activation date.

23. A method for walk-up, fully automated installation process, the method comprising the steps of:
   accessing replicable output device instructions, including an installer program, for an uniquely identified output device selected by a user as the output device the user wants to access;
   commanding said output device to synthesize a complete installer program including an unique output device identification and activation date;
   writing the replicable installer program for the unique output device identification and activation date to temporary storage device;
   communicating the installer program to a user input device; and
   executing the installer program on said user input device by installing and accessing the temporary storage device contents for the unique output device identification and activation date.

24. The method of claim 23, said output device further comprising a networked document scanner device to configure the user input device with the network scanner device driver.

* * * * *